July 6, 1937.   M. JONSSON   2,086,299
APPARATUS FOR WORKING SAW TEETH
Filed Sept. 27, 1935

M. Jonsson
INVENTOR

By Glascock Downing & Seebold
Attys

Patented July 6, 1937

2,086,299

UNITED STATES PATENT OFFICE 2,086,299

APPARATUS FOR WORKING SAW TEETH

Martin Jonsson, Woxna, Sweden, assignor to Sandvikens Jernverks AB, Sandviken, Sweden Application September 27, 1935, Serial No. 42,520
In Sweden February 4, 1935

4 Claims. (Cl. 76—31)

This invention relates to apparatus for working saw teeth in which the teeth are beveled on both cutting edges on the same side of the saw blade.

One of the most serious difficulties which arise in sharpening saw teeth is that the angle of cutting edge and the angle of tooth point must be made correct along the whole length of the saw blade in order that the saw may operate effectively. As the sharpening work usually is done by means of a manually operated flat file or a similar tool it is obvious that the result will be highly dependent on the skill and practice of the filer, and it is necessary that the filer has the power of estimating the correct angles with great care.

A principal object of the present invention is to facilitate the sharpening work and to make it more independent of the individual skill of the filer. According to one of the characteristic features of the invention this result is attained by the provision of a sharpening tool which has concave working surface and is guided in guide means adapted to be attached to the saw blade. As will appear from the description and drawing the tool bevels the teeth simultaneously on both edges on the same side of the blade.

Further objects and advantages of the invention will be described with reference to the accompanying drawing, which illustrates the invention in one preferred embodiment.

Figure 1:
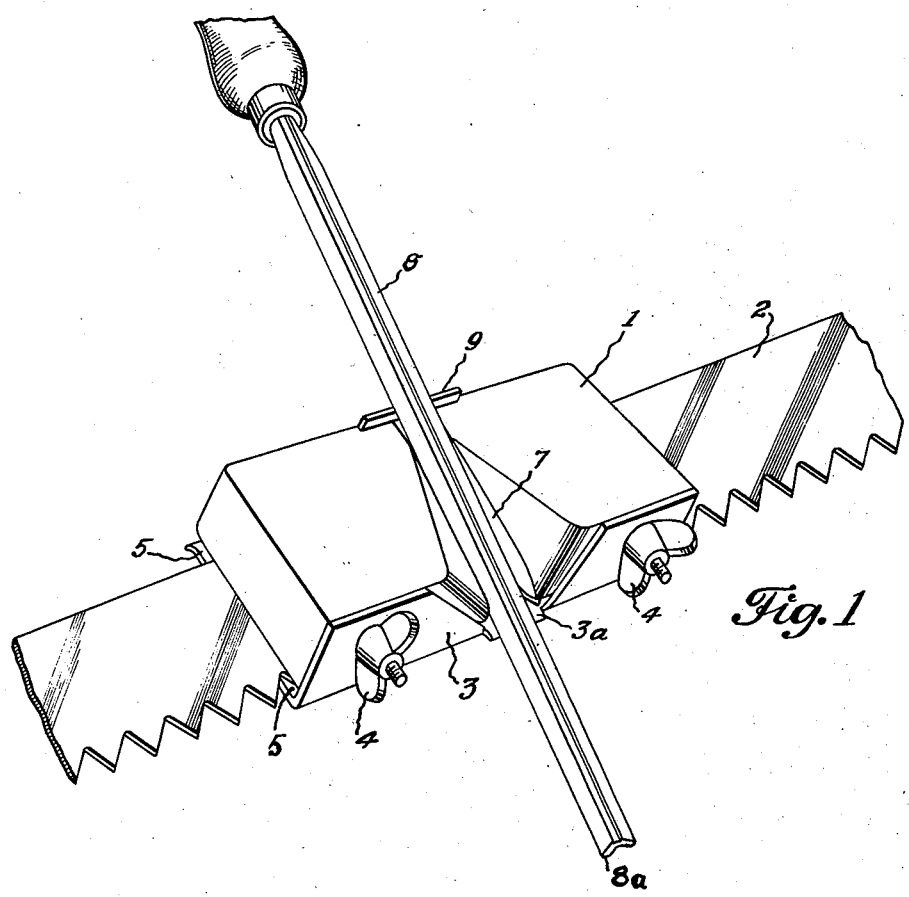
Figure 1 is a perspective view of the guide in fixed position at a saw blade.

In the drawing, 1 is a block or frame body provided with suitable fastening means adapted to fix the block at a saw blade 2. The fastening means may consist of a plate 3 or a similar member which is angularly bent to fit to the bottom surface and one side wall of the block, as clearly shown in Fig. 1. The plate is adapted to be adjustably fixed to the block 1, say by means of screws 4, so that between the bottom of the block and the plate 3 there is left a narrow space 5 adapted to receive the saw blade 2. When the plate is fixed in the proper position the saw blade is clamped to the block and is tightly engaged by the plate 3 (Figure 1).

The block 1 comprises guiding means, preferably in the form of an inclined groove or channel 7 adapted to positively guide a file or similar sharpening tool 8 in a desired angle to the plane of the saw blade. Between the guide 7 and the front edge 3a of the plate 3 there is left a free aperture in which one or more saw teeth are exposed so that they can be worked by means of the file 8.

Figures 2, 3:
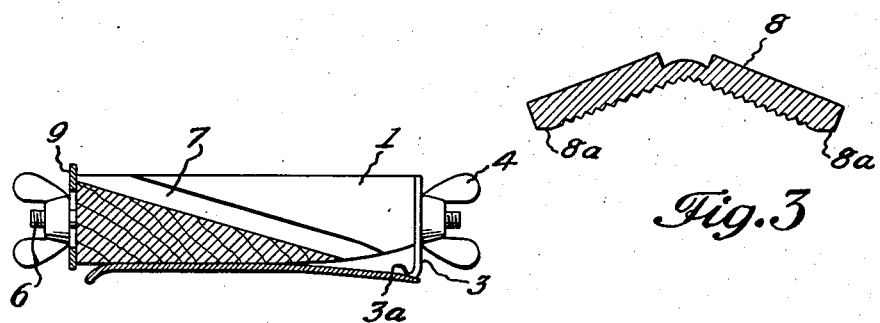
Figure 2 is a cross section of the guide, the saw blade being removed.
Figure 3 is a cross section of one embodiment of the file or sharpening tool, drawn on a larger scale.

As shown in Figure 3 the working surface of the file 8 forms a V or concave angle with the cutting edges on the inside of the V. The value of this angle is so chosen as to enable the file to fit to the angle of cutting edges of the saw tooth. In this manner the desired angle of cutting edge is automatically obtained when the file is used. During the filing work the file is guided in the guide 7 and as the inclination of the latter to the plane of the saw blade and to the teeth determines the angle of tooth point there will be no difficulties in attaining the desired correct angles. It will be understood from the above that the two cutting edges of each tooth of the saw 2 are worked simultaneously and that the angle of the guide 7 determines the angle at which the cutting edges of the teeth are formed.

When one tooth has been sharpened or filed to the desired extent the saw blade is drawn forward through the space between the block 1 and the plate 3 so that the next tooth to be sharpened is exposed in the aperture. In this manner all teeth are worked in succession and the angles will be correct throughout the whole length of the blade.

Preferably the block 1 carries a support member or a plate 9 which can be adjustably fixed to the rear portion of the block, say by means of an oblong vertical recess and screw 6 projecting therein, by means of which the plate 9 can be adjusted in a plane perpendicular to the plane of the saw blade. During the filing operation the file is supported by the said plate 9.

The file 8 can have different forms according to the shape of tooth which is desired to be produced. The concave angle or apex of the V between the working surfaces of the file can be chosen within a great range. If it is desired to sharpen or work saw teeth with rounded tops it is preferred to give the bottom surface of the file a more or less rounded shape as shown in Fig. 3.

In order to prevent great wear of the plate 9 or the groove 7 the outer longitudinal edges 8a of the file may have smooth surfaces. During the work the file slides on these smooth edges and causes no substantial wear of the guiding or supporting parts.

It should be understood that the invention is not limited to the illustrated embodiment but may be varied in many ways without departing from the spirit of the invention.

Having now fully described the invention, what I claim as new and desire to protect by Letters Patent is:

1. Apparatus for working saw teeth, comprising a sharpening tool of V section with filing faces on the inner surfaces, guiding means adapted to receive and guide the sharpening tool and means for attaching the said guiding means on a saw blade so that both cutting edges of each tooth are sharpened simultaneously on the same side of the blade.

2. Apparatus for working saw teeth, comprising a sharpening file of V section with filing faces on the inner surfaces, a block, means for adjustably attaching the block on the saw blade to be sharpened and a guide in the block adapted to receive and guide the file whereby both cutting edges of each tooth are sharpened simultaneously on the same side of the blade.

3. Apparatus for sharpening saw teeth, comprising a file of V section with filing faces on the inner surfaces, a block, means for adjustably clamping the block on a saw blade and an inclined groove in the block adapted to receive and guide the file at the desired angle to the plane of the saw blade whereby both cutting edges of each tooth are sharpened simultaneously on the same side of the blade.

4. Apparatus for sharpening saw teeth comprising a file of V section with filing faces on the inner surfaces and smooth longitudinal edges, guiding means adapted to support and slidably guide the smooth edges of the file and means for attaching the said guiding means on a saw blade whereby both cutting edges of each tooth are sharpened simultaneously on the same side of the blade.

MARTIN JONSSON.